United States Patent [19]
Lee

[11] Patent Number: 5,357,382
[45] Date of Patent: Oct. 18, 1994

[54] APPARATUS AND METHOD FOR AUTOMATICALLY CONTROLLING ADJUSTMENT OF HEAD SWITCHING POINT BY USING VERTICAL SYNCHRONIZATION SIGNAL IN VCR

[75] Inventor: Seung E. Lee, Kyungki-Do, Rep. of Korea

[73] Assignee: Goldstar Co., Ltd., Rep. of Korea

[21] Appl. No.: 900,277

[22] Filed: Jun. 18, 1992

[30] Foreign Application Priority Data

Jun. 21, 1991 [KR] Rep. of Korea ............... 10358/1991

[51] Int. Cl.$^5$ ............................................. G11B 15/14
[52] U.S. Cl. ...................................................... 360/64
[58] Field of Search ................ 360/10.3, 19.1, 27, 360/362, 66, 70, 77.13, 77.15, 77.16, 64; 600/9; 307/527; 328/129; 377/20

[56] References Cited
U.S. PATENT DOCUMENTS

| | | | |
|---|---|---|---|
| 4,614,985 | 9/1986 | Tsuruta | 360/64 |
| 4,816,926 | 3/1989 | Moriwaki et al. | 360/32 X |
| 4,829,389 | 5/1989 | Fukuda | 360/10.2 X |
| 4,849,830 | 7/1989 | Kim | 360/10.3 X |
| 4,912,577 | 3/1990 | Kim | 360/77.13 |
| 4,914,531 | 4/1990 | Kaaden et al. | 360/64 |
| 4,975,788 | 12/1990 | Yamanishi | 360/10.1 |
| 4,994,916 | 2/1991 | Pshtissky et al. | 360/18 X |
| 5,012,358 | 4/1991 | Kohsaka | 360/77.13 X |
| 5,050,010 | 9/1991 | Park | 360/33.1 |
| 5,172,241 | 12/1992 | Lee | 360/33.1 X |

FOREIGN PATENT DOCUMENTS 0170183 6/1983 Japan ..................... 358/18

Primary Examiner—John Shepperd
Assistant Examiner—Patrick Wamsley
Attorney, Agent, or Firm—Ostrolenk, Faber, Gerb & Soffen

[57] ABSTRACT

An apparatus and method for automatically controlling adjustment of a head switching point in a VCR allows for automatic adjustment of the head switching point instead of the conventional manual adjustment thereof. The adjustment can be performed during every tape playback routine, thereby providing stable image quality. According to the present invention, a drum pulse signal is amplified by an amplifier, delayed by a time constant of a delay monostable multivibrator and output as a head switching signal by a frequency generator. The microcomputer outputs control data to adjust a head switching point by adjusting the constant of the monostable multivibrator such that a desired head switching point is obtained. The control data from the microcomputer is converted by a digital/analog converter into an analog voltage signal for adjustment of the time constant of the delay monostable multivibrator, thereby enabling the desired adjustment of the head switching point.

8 Claims, 3 Drawing Sheets

APPARATUS AND METHOD FOR AUTOMATICALLY CONTROLLING ADJUSTMENT OF HEAD SWITCHING POINT BY USING VERTICAL SYNCHRONIZATION SIGNAL IN VCR

BACKGROUND OF THE INVENTION

1. Field of the Invention

The present invention relates in general to adjustment of a head switching point in a video cassette tape recorder (VCR), and more particularly to an apparatus and method for automatically controlling adjustment of a head switching point in a VCR, whereby automatic adjustment of the head switching point can be substituted for conventional manual adjustment thereof and performed during every tape playback routine to provide stable image quality.

2. Description of the Prior Art

Referring to FIG. 1, there is shown a block diagram of a conventional head switching point adjustment apparatus for a VCR. The illustrated apparatus comprises an amplifier 1 for amplifying a drum pulse signal P.G outputted from a drum pulse generator (not shown), a delay monostable multivibrator 2 being triggered by a signal output from the amplifier 1 to output a pulse signal delayed by a time constant which is determined by a variable resistor VR1 and a capacitor c1, a frequency generator 3 responsive to the pulse signal output from the delay monostable multivibrator 2 for outputting a head switching signal with a predetermined frequency of 30Hz.

The operation of the conventional head switching point adjustment apparatus for the VCR with the above-mentioned construction will hereinafter be described with reference to FIG. 2.

Upon application of the drum pulse signal P.G as shown in the first line of FIG. 2, the amplifier 1 amplifies the received drum pulse signal P.G by a predetermined amplification amount and applies the amplified pulse signal as a trigger signal to the monostable multivibrator 2. Upon being triggered by the pulse signal from the amplifier 1, the monostable multivibrator 2 outputs a pulse signal PS as shown in the second line of FIG. 2 delayed by a time constant which is determined by the variable resistor VR1 and capacitor c1.

The pulse signal from the monostable multivibrator 2 is input to the frequency generator 3. Generated in the frequency generator 3 is a frequency signal (30 Hz) toggled at a falling edge of the pulse signal from the monostable multivibrator 2, as shown in the third line of FIG. 2. The generated frequency signal (30Hz) from the frequency generator 3 is outputted as a head switching signal HSW30Hz.

It is generally prescribed that a vertical synchronous signal Vsync is delayed by 6.5H(=412 $\mu$sec) behind a switching point of the head switching signal HSW30Hz. This means that the switching point of the head switching signal HSW30Hz from the frequency generator 3 as shown in the third line of FIG. 2 must be faster by 6.5H than the vertical synchronous signal Vsync as shown in the fourth line of FIG. 2.

For this reason, an interval between the switching point of the switching signal frequency HSW30Hz and the vertical synchronous signal Vsync must be adjusted to 6.5H. To achieve that adjustment, the variable resistor VR1 for the monostable multivibrator 2 must be adjusted to vary the time constant.

The adjusting process of various setting point values is usually done in a VCR manufacturing plant where a technician performs the adjustment of the switching point by adjusting the time constant variable resistor VR1 for the monostable multivibrator 2. The technician determines a desired resistance point for the variable resistor VR1 while observing waveforms of the head switching signal frequency HSW30Hz and the vertical synchronous signal Vsync displayed on an oscilloscope.

However, the conventional head switching point adjustment apparatus for the VCR has a disadvantage, in that the adjustment of the head switching point is performed manually. This manual adjustment process results in inconvenience, a high rate of error generation and the need for attendant adjusting equipment such as an oscilloscope.

Also, a VCR in which a volume of the variable resistor VR1 is altered by an external vibration and erroneously adjusted is not compatible with a different VCR. This results in a noise on the lower portion of the screen caused by the switching error resulting from using two different VCRs interchangeably. Further, in playing back a video tape recorded by the different VCR, the vertical synchronizations of the two VCRs do not match each other.

SUMMARY OF THE INVENTION

Therefore, it is an object of the present invention to provide an apparatus and method for automatically controlling the adjustment of a head switching point in a VCR using a microcomputer.

In accordance with one aspect of the present invention, there is provided an apparatus for automatically controlling the adjustment of a head switching point in a VCR, including an amplifier for amplifying a drum pulse signal; a delay triggered by a pulse signal output from the amplifier to output a pulse signal delayed by a predetermined period of time; a frequency generator responsive to the output pulse signal from the delay for outputting a head switching signal; a controller responsive to the head switching signal output from the frequency generator and a vertical synchronous signal for outputting control data to adjust a head switching point by adjusting the predetermined delay period of time of the delay such that a desired head switching point is obtained; and a digital/analog converter for converting the control data for adjustment of the head switching point, output from the controller, into an analog voltage signal and applying the analog voltage signal as a voltage for adjustment of the predetermined delay time period of the delay.

In accordance with another aspect of the present invention, there is provided a method of automatically controlling adjustment of a head switching point in a VCR, including the steps of enabling a first input port for a head switching signal; upon input of the head switching signal, clearing a first counter and then starting counting operation of the first counter and enabling a second input port for a vertical synchronous signal; upon input of the vertical synchronous signal, stopping the operation of the first counter and disabling the first input port for the head switching signal and the second input port for the vertical synchronous signal; if a count value of the first counter is greater than or equal to a first predetermined value, increasing a value of control data to be outputted to a digital/analog converter, clearing a second counter and returning to the step of enabling the first input port after a predetermined delay period of time; if a count value of said first counter is smaller than or equal to a second predetermined value, decreasing a value of the control data to be outputted to the digital/analog converter, clearing the second counter and returning to the step of enabling the first input port after a predetermined delay period of time; if a count value of the first counter is between the first and second predetermined values, incrementing a count value of the second counter and, then, if the increased count value of the second counter is not equal to a predetermined value, returning to the first step to repeatedly perform the routine until the increased count value of the second counter is equal to the predetermined value.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

Figure 1:
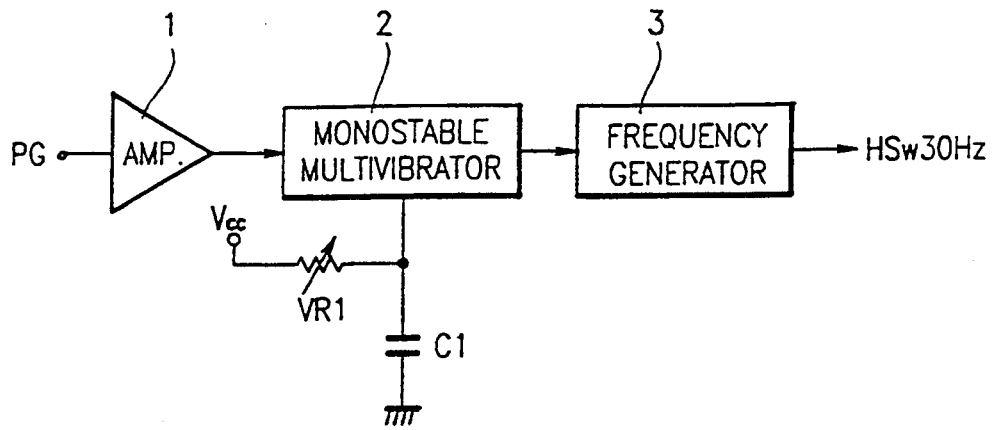
FIG. 1 is a block diagram of a conventional head switching point adjustment apparatus for a VCR.
Figure 2:
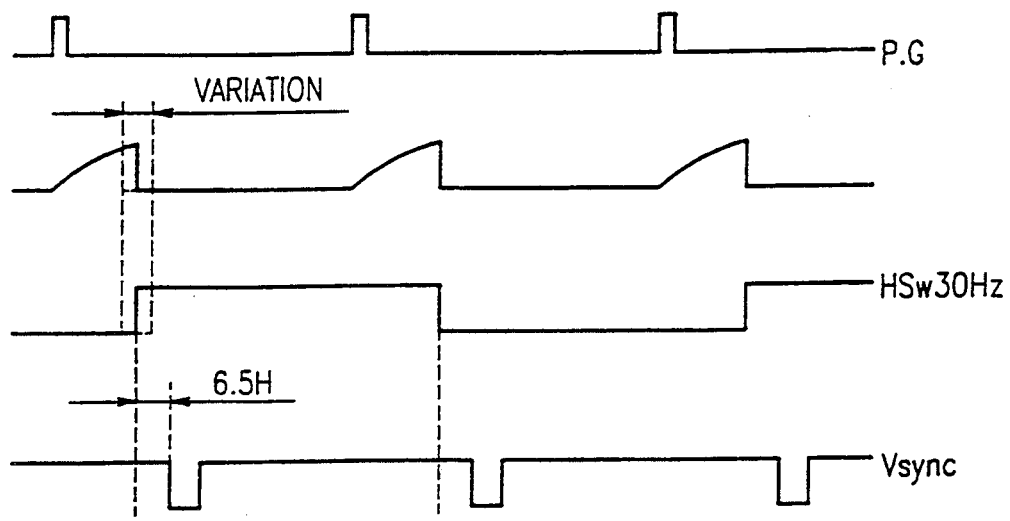
FIG. 2 illustrates waveform diagrams of signals from respective components in the apparatus of FIG. 1.
Figure 3:
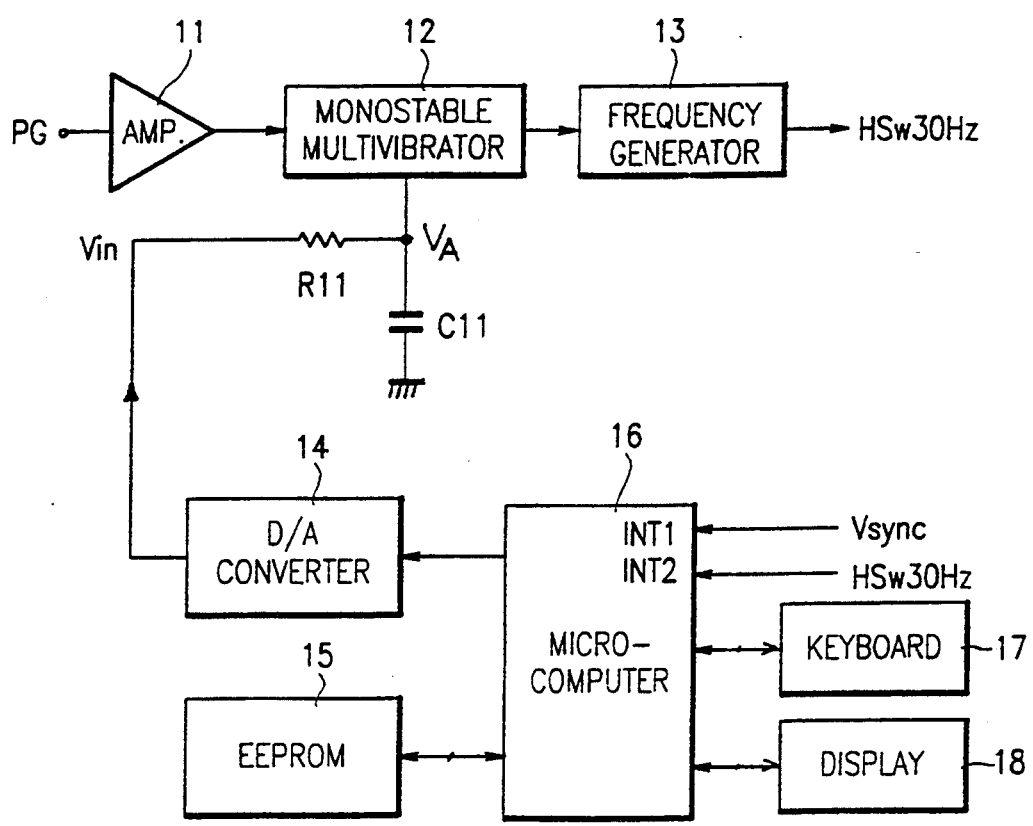
FIG. 3 is a block diagram of an apparatus for automatically controlling adjustment of a head switching point in a VCR in accordance with the present invention.

Referring to FIG. 3, there is shown, in block form, an embodiment of an apparatus for automatically controlling adjustment of a head switching point in a VCR in accordance with the present invention. As shown in this figure, the apparatus of the present invention includes an amplifier 11 for amplifying a drum pulse signal P.G, a delay monostable multivibrator 12 being triggered by an amplified pulse signal output from the amplifier 11 to output a pulse signal delayed by a time constant which is determined by a resistor R11 and a capacitor C11, a frequency generator 13 responsive to the pulse signal output from the delay monostable multivibrator 12 for outputting a head switching signal HSW30Hz, a microcomputer 16 responsive to the head switching signal HSW30Hz output from the frequency generator 13 and a vertical synchronous signal Vsync for outputting control data to adjust a head switching point by adjusting the time constant of the monostable multivibrator 12 such that the desired head switching point is obtained, and a digital/analog converter 14 for converting the control data for adjustment of the head switching point, output from the microcomputer 16, into an analog voltage signal and applying the analog voltage signal to the resistor R11 for the time constant of the delay monostable multivibrator 12 to adjust the time constant thereof.

Also, the apparatus of the present invention includes a keyboard 17 for supplying to the microcomputer 16 a key signal for a user-activated automatic adjustment of the head switching point and a display 18 for displaying that the current operation being performed is the automatic adjustment of the head switching point, under control of the microcomputer 16 and according to the key signal input from keyboard 17 for the automatic adjustment of the head switching point.

Further, the apparatus of the present invention includes an EEPROM 15 for storing the control data for the adjustment of the head switching point, output from the microcomputer 16 and enabling output of the same control data stored in the EEPROM even upon power off/on.

Figure 4:
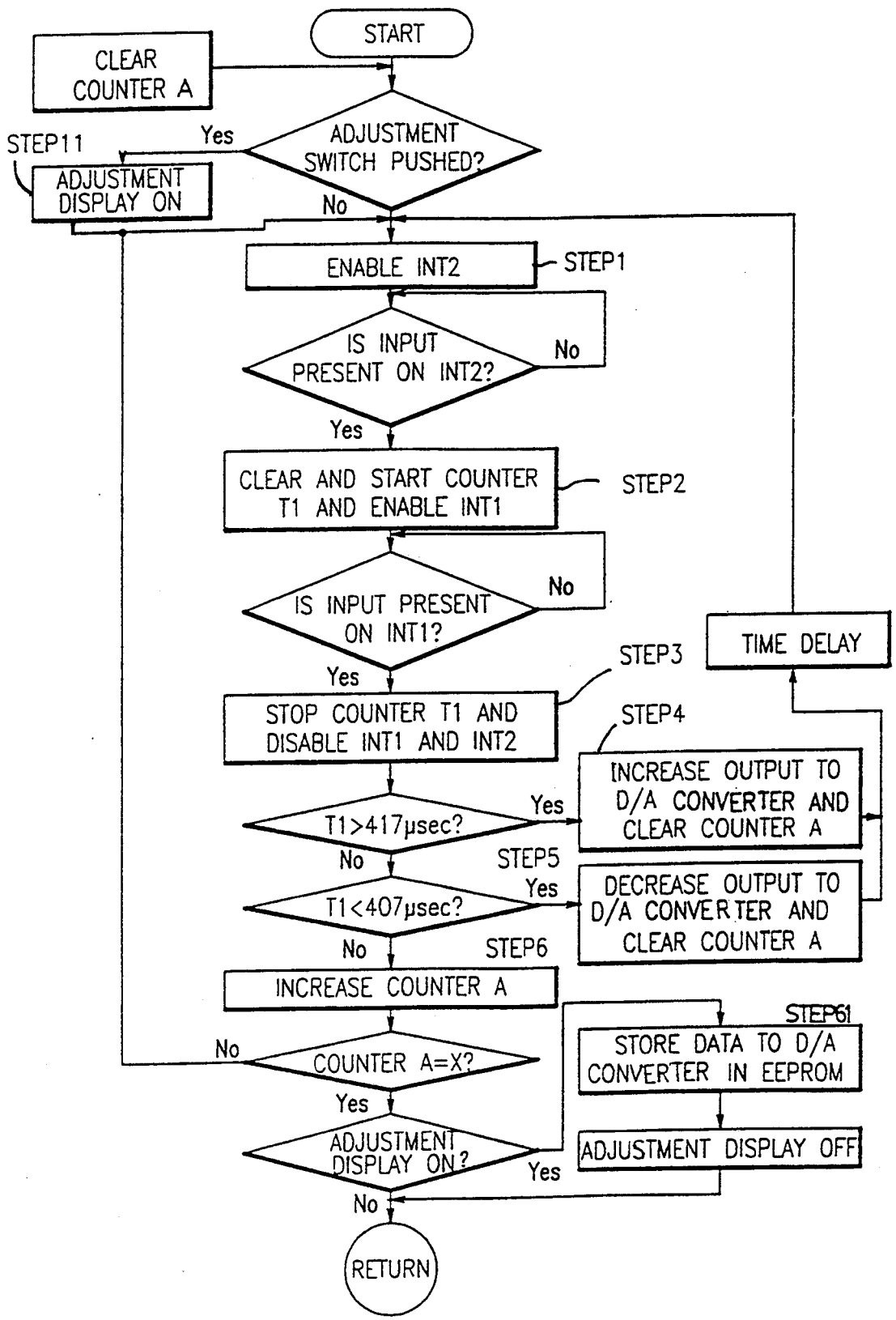
FIG. 4 is a flowchart illustrating a method of automatically controlling adjustment of the head switching point in the VCR in accordance with the present invention.

Referring to FIG. 4, there is shown a flowchart illustrating a method of automatically controlling adjustment of the head switching point in the VCR in accordance with the present invention. As shown in this figure, the method of the present invention includes an initial step of clearing a counter A. The method also includes a step of determining if a head switching point automatic adjustment key on keyboard 17 is activated. If the key is activated, the display 18 displays that the current operation being performed is the automatic adjustment of the head switching point at STEP11.

The method of the present invention further includes a step STEP1 of enabling an input port INT2 for the head switching signal HSW30Hz which occurs either after performing the automatic adjustment displaying step STEP11 or if no key signal for the automatic adjustment of the head switching point is fed from the keyboard 17. Upon the input of the head switching signal HSW30Hz, the steps of clearing a counter T1 and then starting the counting operation of the counter T1 and enabling an input port INT1 for the vertical synchronous signal Vsync are performed at STEP2. When the vertical synchronous signal Vsync is input, a step STEP3 is performed. STEP3 includes the steps of stopping the operation of the counter T1 and disabling the input port INT2 for the head switching signal HSW30Hz and the input port INT1 for the vertical synchronous signal Vsync. If a count value of the counter T1 is greater than or equal to the maximum value (417 $\mu$sec), a value of the control data to be outputted to the digital/analog converter 14 is increased and, the counter A is cleared at step STEP14. Then the flow returns, after a predetermined delay, to the step STEP1. If a count value of the counter T1 is smaller than or equal to the minimum value (407 $\mu$sec), a value of the control data to be outputted to the digital/analog converter 14 is decreased, and the counter A is cleared at step STEP5. Then the flow returns, after a predetermined delay, to the step STEP1. If a count value of the counter T1 is between the maximum value and the minimum value, i.e., 417 $\mu$sec > T1 > 407 $\mu$sec, a count value of the counter A is increased at step STEP6 and, then, if the increased count value of the counter A is not equal to a predetermined value X, the flow returns to the first step STEP1.

If the increased count value of the counter A is equal to X and if the automatic head switching point adjustment display is turned on, the control data outputted to the digital/analog converter 14 is stored in the EEPROM 15 and the automatic head switching point adjustment display is turned off at step STEP61. Then the flow returns to the main routine.

Now, the operation of the above-mentioned construction in accordance with the present invention will be described in detail with reference to FIG. 4.

Upon application of the drum pulse signal P.G resulting from detection of rotation of a head drum, the amplifier 11 amplifies the received drum pulse signal P.G by a predetermined amplification amount and applies the amplified pulse signal as a trigger signal to the monostable multivibrator 12. Upon being triggered at a rising edge of the amplified pulse signal output from the amplifier 11, the monostable multivibrator 12 outputs a pulse signal delayed by a time constant which is determined by the resistor R11 and capacitor c11.

The pulse signal from the monostable multivibrator 12 is input to the frequency generator 13. Generated in the frequency generator 13 is a frequency signal (30Hz) toggled at a falling edge of the pulse signal from the monostable multivibrator 12. The generated frequency signal (30Hz) from the frequency generator 13 is output as a head switching signal HSW30Hz.

As mentioned previously, the vertical synchronous signal Vsync should be delayed by 6.5H(=412 μsec) behind a switching point (edge point) of the head switching signal HSW30Hz. For this reason, an interval between the switching point of the switching signal frequency HSW30Hz and the vertical synchronous signal Vsync must be adjusted to 6.5H. To achieve that adjustment, the time constant of the monostable multivibrator 12 must be varied to adjust the switching point of the head switching signal.

As mentioned above, the time constant of the monostable multivibrator 12 is determined by the resistor R11 and the capacitor C11. In accordance with the present invention, the adjustment of the time constant is made by variation of the voltage Vin being applied to the resistor R11.

The time constant (t) varies according to a voltage $V_A$ at a junction of the resistor R11 and the capacitor C11 as follows.

$$V_A = Vin[1 - e^{-(1/RC)}], \text{ thus}$$

$$t = -RC \ln(1 - V_A/Vin)$$

From the above equations, it can be seen that the time constant (t) is in direct proportion to R and C and in inverse proportion to Vin. For this reason, the variation of the time constant (t) can be made by varying the input voltage Vin applied to the resistor R11, without varying the resistance R of the resistor R11. Namely, as the input voltage Vin applied to the resistor R11 is varied, the time constant (t) is varied.

Therefore, upon receiving as interrupt signals, the head switching signal HSW30Hz from the frequency generator 13 and the vertical synchronous signal Vsync, the microcomputer 16 outputs the control data to adjust the head switching point by adjusting the time constant of the monostable multivibrator 12 such that the desired head switching point is obtained. The control data output from the microcomputer 16 is then converted by the digital/analog converter 14 into the analog voltage Vin to be applied to the resistor R11 for the variation of the time constant of the delay monostable multivibrator 12. As a result of the variation of the time constant of the delay monostable multivibrator 12, an interval between the switching point of the switching signal frequency HSW30Hz and the vertical synchronous signal Vsync can be adjusted to the prescribed 6.5H.

On the other hand, referring again to FIG. 4 in conjunction with the method for automatically controlling adjustment of the head switching point in the VCR using the microcomputer 16, first, the microcomputer 16 initializes the counter A and then checks whether a key signal for the automatic adjustment of the head switching point is input from the keyboard 17. Herein, the counter A counts the predetermined time X to maintain the control data for the adjustment of the head switching point if the control data is not varied during the predetermined time X, when the adjustment of the head switching point is to be made at a predetermined point in a playback routine. Also, the key signal for the automatic adjustment of the head switching point is generated by a user pushing a corresponding key on the keyboard 17 when the user would like to store the control data value for the adjustment of the head switching point.

If the user pushes the corresponding key on the keyboard 17 to store the control data value for the adjustment of the head switching point, the microcomputer 16 performs the automatic adjustment displaying step STEP11 of displaying on the display 18 that the current operation being performed is the automatic adjustment of the head switching point. Then, after performing the automatic adjustment displaying step STEP11 or if no key signal for the automatic adjustment of the head switching point is fed from the keyboard 17, the microcomputer 16 performs the step STEP1 of enabling the input port INT2 for the head switching signal HSW30Hz.

Upon input of the head switching signal HSW30Hz, the microcomputer 16 performs the step STEP2 of clearing the counter T1 and then starting the operation thereof at the edge timing of the head switching signal HSW30Hz to calculate the control data value for the adjustment of the head switching point and enabling the input port INT1 for the vertical synchronous signal Vsync.

Thereafter, with the vertical synchronous signal Vsync input, the microcomputer 16 performs the step STEP3 of stopping the operation of the counter T1 at the falling edge of the vertical synchronous signal Vsync and disabling the input port INT2 for the head switching signal HSW30Hz and the input port INT1 for the vertical synchronous signal Vsync.

If a count value of the counter T1 is greater than or equal to a first predetermined value, or the maximum value (417 μsec), i.e., T1≦417 μsec, the microcomputer 16 performs the step STEP4 of increasing a value of the control data to be output to the digital/analog converter 14, clearing the counter A and returning after a predetermined delay to the step STEP1.

On the other hand, if a count value of the counter T1 is smaller than or equal to a second predetermined value, or the minimum value (407 μsec), i.e., T1≦407 μsec, the microcomputer 16 performs the step STEP5 of decreasing a value of the control data to be output to the digital/analog converter 14, clearing the counter A and returning after a predetermined delay to the step STEP1.

At the present steps STEP4 and STEP5, the reason for providing a delay after the variation of the control data to be output to the digital/analog converter 14 is because the adjustment of the head switching point is made during the delay.

Also, if a count value of the counter T1 is between the first predetermined value (the maximum value) and the second predetermined value (the minimum value), i.e., 417 μsec>T1>407 μsec, the microcomputer 16 performs the step STEP6. Namely, at the step STEP6, the microcomputer 16 increases a count value of the counter A and then checks whether the increased count value of the counter A is equal to the predetermined value X. If it is determined that the increased count value of the counter A is not equal to the predetermined value X, the microcomputer 16 returns to the step STEP1. Thus, the count value of the counter A is a value for checking the predetermined time X to maintain the control data value for the adjustment of the head switching point if the control data is not varied during the predetermined time X, when the adjustment of the head switching point is to be made during a predetermined period in the playback routine.

On the contrary, if it is determined at the step STEP6 that the increased count value of the counter A is equal to the predetermined value X, the microcomputer performs the data storing step STEP61. Namely, at the step STEP61, the microcomputer 16 checks whether the automatic head switching point adjustment display is turned on. If it is determined that the automatic head switching point adjustment display is off, i.e., if no key signal for the automatic adjustment of the head switching point is fed from the keyboard 17, the microcomputer 16 returns directly to the main routine. On the other hand, if it is determined that the automatic head switching point adjustment display is on, i.e., if the key signal for the automatic adjustment of the head switching point is fed from the keyboard 17, the microcomputer 16 stores the control data outputted to the digital-/analog converter 14 in the EEPROM 15, turns off the automatic head switching point adjustment display and then returns to the main routine.

As a result, in the normal playback routine, the adjustment of the head switching point is automatically performed during a predetermined period, and then the operation returns to the main routine, with the control data for the adjustment of the head switching point being maintained, if the control data is not varied during the predetermined time X. Also, when the user pushes the corresponding key on the keyboard 17 to store the control data for the adjustment of the head switching point, it is displayed that the current operation being performed is the automatic adjustment of the head switching point and the adjustment of the head switching point is performed in the same manner as in the playback routine. In this case, if the control data is not varied during the predetermined time X, the control data for the adjustment of the head switching point at that point of time is stored in the EEPROM 15, thereby enabling the maintenance of the same control data even upon power off/on.

In other words, if the above playback routine is performed in playing back a video tape and, in a case where the control data for the adjustment of the head switching point is stored, the output voltage from the digital-/analog converter 14 is set using the control data that is adjusted according to a standard video tape and then stored in the EEPROM 15. This results in good compatibility of one VCR with a different VCR.

As hereinbefore described, according to the present invention, the automatic adjustment of the head switching point can be substituted for the conventional manual adjustment thereof. This results in enhancement in productivity of the VCR and, also, avoidance of an error resulting from the undesired adjustment of the resistor volume caused by external vibration.

Further, the problem resulting from a video tape recorded by a VCR in which the head switching point is adjusted erroneously or does not meet a standard requirement because of various factors can be solved by the present invention. Namely, in accordance with the present invention, because the variation of the head switching point is made on the basis of the vertical synchronous signal Vsync, omitted portions of the signal and noise due to the switching error are not present on the screen. Also, vertical synchronization discordance between different VCRs playing back the same video tape can be prevented.

Although preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for automatically controlling adjustment of a head switching point in a VCR, the apparatus comprising:
    an amplifier for amplifying each of a plurality of drum pulse signals to output an amplified pulse signal;
    a delay circuit triggered by each of the amplified pulse signals output from said amplifier to output a pulse signal delayed by a predetermined delay period;
    a frequency generator responsive to the pulse signal output from said delay circuit for outputting a head switching signal;
    a controller responsive to the head switching signal output from said frequency generator and a vertical synchronous signal, for outputting control data to adjust a head switching point by adjusting the predetermined period of time such that a predetermined head switching point is obtained;
    a digital/analog converter for converting the control data output from said controller into an analog voltage signal and applying the analog voltage signal as a voltage to said delay circuit to adjust the predetermined delay period of said delay circuit; and
    a memory for selectively storing said control data output from said controller in response to an input signal.

2. An apparatus for automatically controlling adjustment of a head switching point in a VCR, as set forth in claim 1,
    wherein said memory comprises an EEPROM for storing the control data for adjusting the head switching point and outputting the control data even if power fails.

3. An apparatus for automatically controlling adjustment of a head switching point in a VCR, as set forth in claim 2, further comprising:
    a keyboard including a switch for controlling said EEPROM; and
    a display for displaying that a current operation being performed by said apparatus is an automatic adjustment of the head switching point.

4. A method of automatically controlling adjustment of a head switching point in a VCR, comprising the steps of:
    enabling a first input port for a head switching signal;
    upon input of the head switching signal, clearing a first counter and then starting a counting operation of the first counter and enabling a second input port for a vertical synchronous signal;
    upon input of the vertical synchronous signal, stopping the operation of said first counter and disabling said first input port for the head switching signal and said second input port for the vertical synchronous signal;

if a count value of said first counter is greater than or equal to a first predetermined value, increasing a value of control data to be output to a digital-/analog converter, clearing a second counter and returning to said step of enabling said first input port after a predetermined delay period of time;

if a count value of said first counter is less than or equal to a second predetermined value, decreasing a value of the control data to be output to said digital/analog converter, clearing said second counter and returning to said step of enabling said first input port after a predetermined period of time; and if a count value of said first counter is between the first and second predetermined values, increasing a count value of a second counter and, then, if the increased count value of said second counter is not equal to a third predetermined value, returning to said step of enabling said first input port repeatedly until the count value of said second counter is equal to the third predetermined value.

5. A method of automatically controlling adjustment of a head switching point in a VCR, as set forth in claim 4, further comprising the step of:

displaying that a current operation is an automatic adjustment of a head switching point, if a key signal for the automatic adjustment of the head switching point is input by a user.

6. A method of automatically controlling adjustment of a head switching point in a VCR, as set forth in claim 4, further comprising the step of:

if the incremented count value of said second counter is equal to the third predetermined value, storing the control data output to said digital/analog converter in an EEPROM and then returning to a main routine.

7. A method of automatically controlling adjustment of a head switching point in a VCR, comprising the steps of:

inputting a head switching signal;

upon input of the head switching signal, starting a counting operation of a first counter and then checking whether a vertical synchronous signal has been input;

stopping the counting operation of said first counter upon input of the vertical synchronous signal;

increasing a value of control data to be output to a digital/analog converter, if a count value of said first counter is greater than or equal to a first predetermined value;

decreasing a value of the control data to be output to said digital/analog converter, if a count value of said first counter is less than or equal to a second predetermined value;

increasing a count value of a second counter if a count value of said first counter is between the first and second predetermined values;

returning to said step of inputting a head switching signal until the increased count value of said second counter is equal to a third predetermined value; and if the increased count value of said second counter is equal to the third predetermined value, storing the current control data and controlling a head switching point according to the stored control data.

8. A method of automatically controlling adjustment of a head switching point in a VCR, comprising the steps of:

inputting a head switching signal and a vertical synchronous signal;

determining an amount of time in which a vertical synchronous signal lags behind a switching point of the head switching signal;

generating control data to control the switching point of the head switching signal according to the amount of time determined in said determining step; and selectively storing said control data in response to an input signal.

* * * * *